Oct. 2, 1934. A. LESAGE 1,975,644
FLYWHEEL MAGNETO
Filed March 2, 1933  2 Sheets-Sheet 1
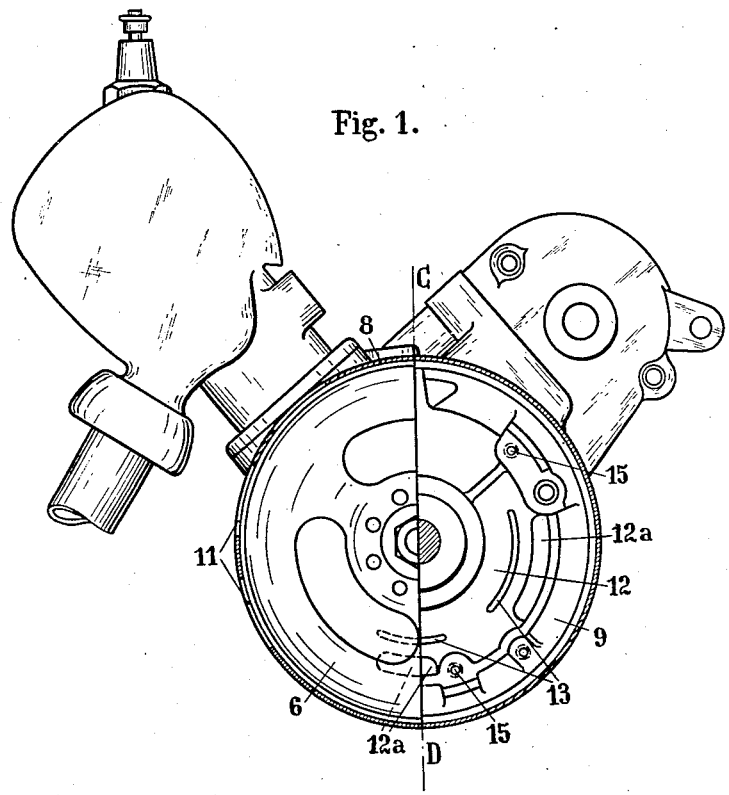
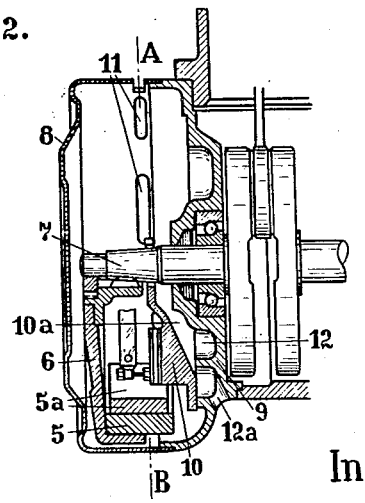
Inventor
Alfred Lesage Oct. 2, 1934.   A. LESAGE   1,975,644
FLYWHEEL MAGNETO
Filed March 2, 1933   2 Sheets-Sheet 2

Inventor
Alfred Lesage
per
Dean Fairbank Hirsch Foster
his Attorneys

Patented Oct. 2, 1934

1,975,644

UNITED STATES PATENT OFFICE 1,975,644

FLYWHEEL MAGNETO

Alfred Lesage, Schweinfurt, Germany

Application March 2, 1933, Serial No. 659,265
In Germany March 12, 1932

11 Claims. (Cl. 171—252)

The invention relates to flywheel magneto-generators as commonly mounted on the crank shaft of combustion engines, while stationary parts of the appliance are fixed to the crank casing of the engine. This has the drawback that the parts of the magneto, which are usually enclosed in a protecting casing, are subject to transmission of heat by radiation and conduction, so that the insulation will be injured and the efficiency of the generator reduced.

The object of the invention is to provide an arrangement and means to prevent excessive heat from being generated in operating parts of the magneto which can readily be damaged.

This object is attained by constructing the bearing member of the stationary parts of the magneto generator in the form of fret-work providing a great number of hollow spaces and channels which in connection with perforations of the casing will permit circulation of fresh air through the generator and cooling of all parts, which circulation will be produced by the quickly rotating magnets.

This object is further increased by the fact that the bearing member having the form of a spider offers only few and small points of contact with the hot wall of the engine, thus reducing thermal conduction from the engine to the generator.

Another means permitting increase of the said object is making the said member of a bad conductor of heat which substance may also be fireproof and have electricity-insulating property.

Two constructional embodiments of the invention are illustrated by way of examples in the annexed drawings, which form a part of this specification and in which—

Fig. 1 is a diagrammatical front elevation of a combustion engine having a magneto according to the invention with a section of the housing of the magneto on the line A—B of Fig. 2, the left side illustrating the flywheel and the right side the front of the crank case without the parts normally mounted thereon;

Fig. 2 is a vertical sectional view of the magneto on the line C—D of Fig. 1, some details being omitted for the purpose of clearness;

Like numerals denote like parts throughout all figures of the drawings.

Figure 3:
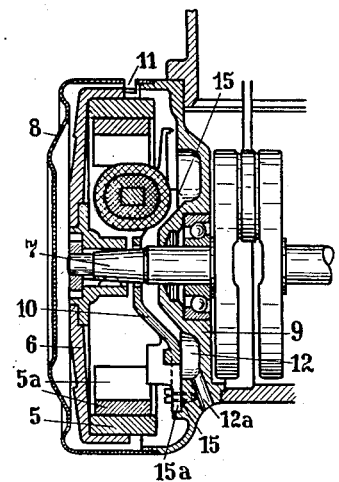
Fig. 3 is a vertical sectional elevation of the second construction.

Referring to the flywheel magneto shown in Figs. 1 and 2, the magnets 5 together with the pole shoes 5a are fastened in the usual way to the flywheel 6 which in turn is keyed on the crank shaft 7 of the engine. The armature coils of the generator and other stationary parts which are, for clearness of the subject matter, not shown are mounted upon a base plate 10 attached to the side wall 9 of the crank case of the engine. All these parts are enclosed in a housing 8 fixed to a marginal flange of the side wall 9.

In the lower part and at right hand, as seen from Fig. 1, a curved depression 12 is made in the wall 9, which depression communicates with the atmosphere through channels 12a, while the concave shape of the rear side of the base plate 10 provides passages 10a giving the air access to the middle part of the device. Near the channels 12a there are placed ribs 13 in the depression 12. Said ribs form baffle or air-deflecting bodies and serve the purpose of retaining dust and other impurities carried with the air from entering the magneto. In the circumferential flange of the housing 8, slot like perforations 11 are made at several points preferably located oppositely to the channels 12a said perforations being the air discharge openings.

The magneto operates as follows. The quickly rotating flywheel of the magneto causes the air contained in the housing to rotate in the same direction. The centrifugal force thereby generated will throw the air through the perforations 11 while fresh air will be drawn into the magneto device through the channels 12a, thus affording a constant cooling of the interior of the housing 8. The baffle members 13 have the effect of subdividing and dispersing the entering air stream, but also checking dust, sand and like solids which will accumulate on the baffles 13 and at times fall out of the housing through the passages 11.

When the appliance is used on a motor cycle the head wind arising with running may also feed air through one or more of the apertures 11.

As may readily be seen from Figs. 1 and 2, the supporting member 10 is fixed to the motor casing 9 only at some few places 15 of small area, so that transmission of heat from the wall 9 to the plate 10 by thermal conduction is reduced.

Figure 4:
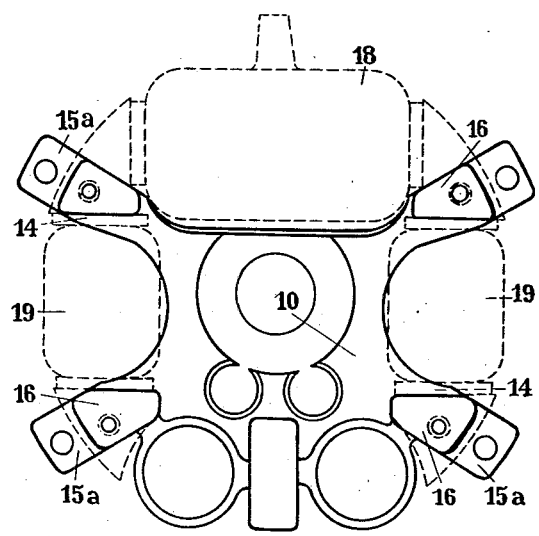
Figs. 4 and 5 are a front view and a side view, respectively, of a detail of this construction on a larger scale.
Figure 5:
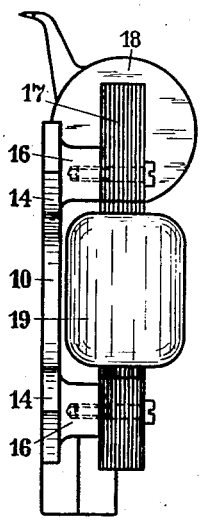

This particular design is more clearly shown in the modification of the apparatus illustrated in Figs. 3-5 in which the flywheel and the magnets are devised as disclosed herebefore, while the supporting member or base plate 10 results in a spider thus more intensively embodying the novel characteristic.

From the central portion of the base plate 10 encircling the crank shaft 7, there project substantially radially on either side supporting arms 14 at their free ends provided with bosses 15a fastened to the crank case and moreover with forwardly projecting lugs 16 to which the laminated cores 17 of armature coils 18 and 19 for the generation of ignition and lamp currents are secured by screws or other fastening means. In this way the armature is freely supported and a clearance obtained between the said armature and the body of the base plate 10. Since the plate 10 is fixed to the wall 9 only at four points with small contacting surfaces heat transmission by conduction to the body of the plate and the apparatus mounted thereon is diminished; furthermore, the coils being placed at a distance from the body and fixed thereon with small contacting surfaces, while being freely suspended so that the circulating air can pass all round their circumference, they will be protected from excessive heating.

In order that transmission of heat by conduction is further reduced, the base plate 10 can be made of a bad heat-conductor, e. g., suitable metals or alloys or insulating materials, such as porcelain or a compressed mass made of artificial resins and fibrinous substances. Most of these materials are not conductors of electricity nor magnetic; besides they are all fireproof.

What I claim is—

1. In a flywheel magneto a housing, a stationary armature in said housing, a supporting plate for the stationary armature, and having bosses projecting radially outwardly and fixed to an end wall of said housing, lugs projecting forwardly from said bosses, the middle part of the plate being at a distance from said end wall, armature cores fixed upon the lugs, and coils suspended on the cores between the said bosses.

2. In a flywheel magneto a housing enclosing the magneto and having air admission and discharge apertures, and an armature supporting plate fixed to an end wall of said housing at a few points and with small contacting surfaces, the said supporting plate being made of electrical, magnetic and heat-insulating material, air distributing passages being provided between the said plate and said end wall.

3. In combination, a casing, and a flywheel magneto in the interior of said casing, including a shaft, a stationary armature, and a fixed plate for supporting the stationary armature, said plate extending transversely with respect to said shaft, having the body portion thereof spaced axially from both end walls of said casing, and forming an air passage with one of said end walls, said casing being provided with one or more inlet apertures adjacent to one end of said passage, and one or more outlet apertures for permitting the escape of air from the interior of said casing.

4. In combination with a casing, a flywheel magneto in the interior of said casing, including a shaft, a plate connected to a wall of said casing, extending transversely with respect to said shaft, and spaced from an end wall of said casing to form a passageway therewith, and an armature coil supported on said plate, said casing being provided with an inlet aperture adjacent to the radially outer end of said passageway, and communicating with the interior of said passageway, said casing being also provided with an outlet aperture adjacent to the periphery of said casing to permit hot air therein to escape therefrom under the centrifugal action of said flywheel magneto.

5. In combination with a casing, a flywheel magneto in the interior of said casing, and including a shaft, a plate connected to a wall of said casing, extending transversely with respect to said shaft, and spaced from an end wall of said casing to form a passageway therewith, baffle members in said passageway for dispersing the air streams passing through said passageway, and an armature coil supported on said plate, said casing being provided with inlet apertures adjacent to the radially outer ends of said passageway and communicating with the interior of said passageway, said casing being also provided with outlet apertures adjacent to the periphery of said casing to permit the hot air therein to escape therefrom under the centrifugal action of said flywheel magneto.

6. In combination with a casing, a flywheel magneto in said casing, including a shaft, and an armature supporting plate extending transversely with respect to said shaft, connected near its outer periphery to a wall of said casing, and contacting therewith at a few spaced points to reduce the transmission of heat from said casing to said plate, said supporting plate being axially spaced from an end wall of said casing to form an air passage therewith, said casing being provided with inlet apertures disposed adjacent to the radially outer ends of said passage and communicating therewith, said casing being also provided with outlet apertures to permit the escape of hot air from the interior of said casing.

7. In combination with a magneto having fixed armature coils, a casing for said magneto having one of the walls thereof provided with one or more depressions, and having inlet apertures communicating directly with said depressions, baffle members in said depressions for dispersing the air directed thereinto from said inlet apertures, and conduits leading from said depressions towards the axis for directing the air towards the central portion of said casing.

8. In combination with a casing, a flywheel magneto in the interior of said casing, and including a shaft, an armature supporting plate connected to a wall of said casing, extending transversely with respect to said shaft, and spaced from an end wall of said casing to form a passageway therewith, said casing being provided with an inlet aperture adjacent to the radially outer end of said passageway and communicating with the interior of said passageway, said casing being also provided with an outlet aperture adjacent to the periphery of said casing to permit hot air therein to escape therefrom under the centrifugal action of said flywheel magneto, and baffle members in said passageway for dispersing the air traveling through said passageway.

9. In combination with a casing, a magneto in said casing, including a shaft, an armature supporting plate extending transversely of said shaft, and having the main body portion thereof axially spaced from an end wall of said casing to form an air passage therewith, said casing having inlet apertures on one side of said supporting plate, adjacent to the radially outer end of said passage, and communicating with said passage, said casing being also provided with outlet apertures on the other side of said plate.

10. In combination with a casing, a flywheel magneto in the interior of said casing, and including a shaft, a fixed armature supporting member extending transversely with respect to said shaft, an armature core fixed to said member, a coil suspended on said core and surrounded around the entire periphery thereof by an air space, said casing having air admission and discharge apertures to permit the passage of air through said casing and around the periphery of said coil to prevent excessive heating of said coil.

11. In combination with a casing, a flywheel magneto in the interior of said casing, and including a shaft, a fixed plate extending transversely with respect to said shaft, and having a pair of projections extending transversely with respect thereto, cores fixed upon said projections, and coils suspended on said cores between said projections and spaced from said plate, said casing having air admission and discharge apertures.

ALFRED LESAGE.